No. 824,809. PATENTED JULY 3, 1906.
L. D. PICKETT.
LUBRICATOR.
APPLICATION FILED SEPT. 14, 1905.
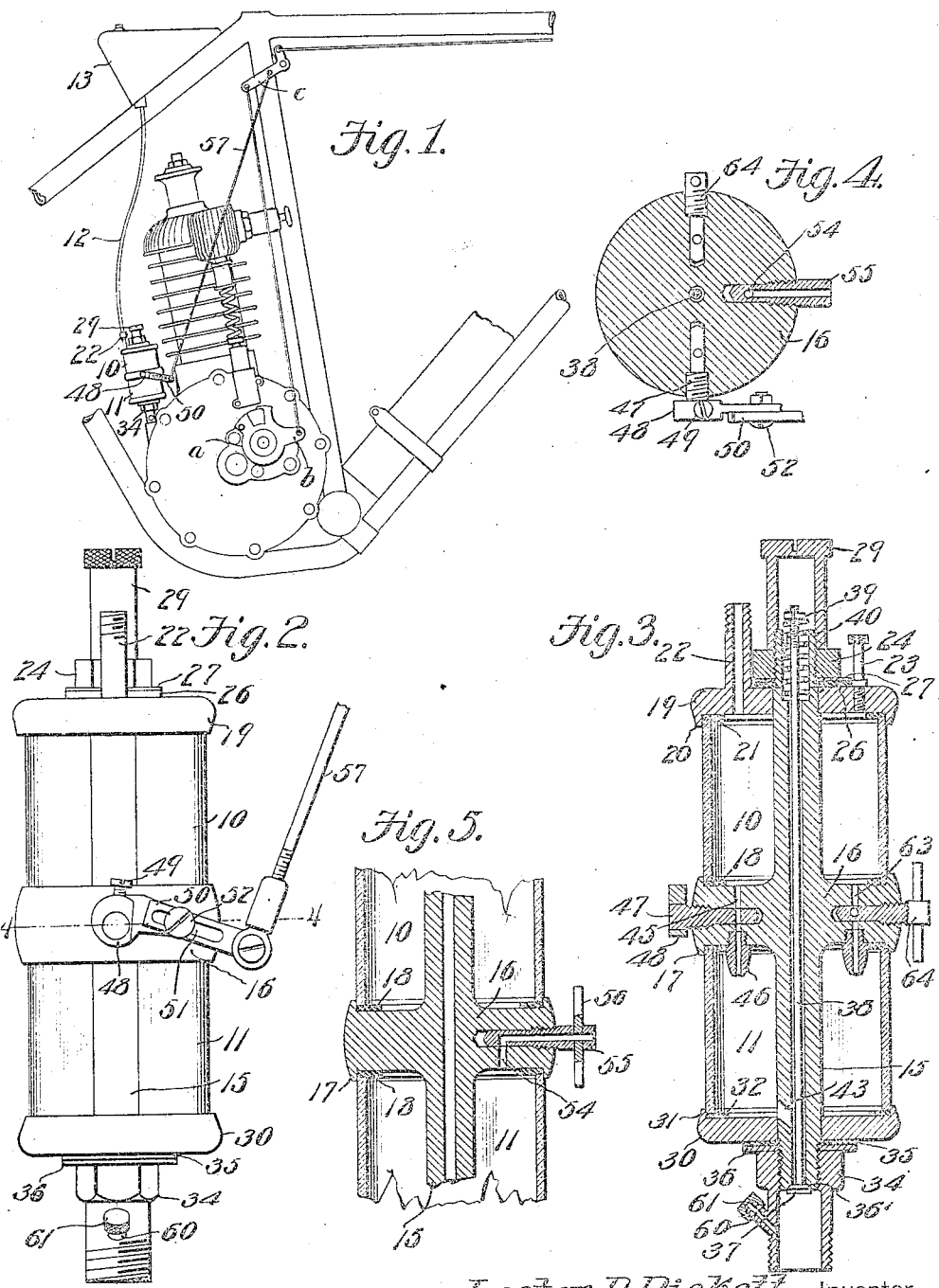
Witnesses
Lester D. Pickett, Inventor
by ——— Attorneys

UNITED STATES PATENT OFFICE.

LESTER DARIUS PICKETT, OF FREDONIA, NEW YORK.

LUBRICATOR.

No. 824,809.　　　　　Specification of Letters Patent.　　　　　Patented July 3, 1906.

Application filed September 14, 1905. Serial No. 278,465.

*To all whom it may concern:*

Be it known that I, LESTER DARIUS PICKETT, a citizen of the United States, residing at Fredonia, in the county of Chautauqua and State of New York, have invented a new and useful Lubricator, of which the following is a specification.

This invention relates to lubricators, and has for its principal object to provide a novel form of lubricator for use in connection with internal-combustion engines.

A further object of the invention is to provide a lubricator wherein the quantity of lubricant supplied to the engine is determined by the speed of the engine.

A still further object of the invention is to provide a suction-feed lubricator in which the lubricant is supplied in measured quantities at the point of delivery, such quantity, proportioned to the speed of the engine, being drawn into the casing on the outstroke of the piston.

A still further object of the invention is to provide a lubricator in which a lubricant-feed chamber is connected to the engine and communication established with the casing of said engine on the outstroke and to employ means for supplying to said feed-chamber a predetermined quantity of oil, the feed-chamber being emptied on each outstroke and replenished between such strokes.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of a lubricator constructed in accordance with the invention, showing the same attached to the engine of a motor-bicycle. Fig. 2 is a side elevation of the lubricator, drawn to an enlarged scale. Fig. 3 is a vertical longitudinal section of the lubricator. Fig. 4 is a sectional plan view of the same on the line 4 4 of Fig. 2. Fig. 5 is a vertical sectional view taken at right angles to the plane in which Fig. 3 is taken.

Similar characters of reference are employed to indicate corresponding parts throughout the several figures of the drawings.

In the majority of internal-combustion engines so-called "splash-feed" lubricators are employed within the crank-casing; but these in many cases are not to be relied upon, especially when the engine is traveling at very high speed, and supplemental suction-feed lubricators have been employed, the casing of the engine being connected to a lubricant-reservoir in such manner as to draw oil into the casing during the outstroke; but in such devices no provision has heretofore been made for regulating the quantity of oil fed, and this results in considerable waste and necessitates the frequent refilling of the lubricant-reservoir.

In carrying out the present invention a pair of lubricant-chambers 10 and 11 is employed, the upper chamber constituting a reservoir for supplying predetermined quantities of lubricant to the lower or feed chamber 11. The upper chamber is connected by a supply-tube 12 to a main reservoir 13, arranged at a suitable elevation, so that the reservoir 10 may be supplied.

The body portion of the lubricator includes a hollow cylindrical stem 15, at the center of which is an annular flange 16, forming a division-plate between the lubricant-chambers 10 and 11, and at the edges of this partition are flanges 17, that serve as retaining devices for the walls of the chambers 10 and 11, these being preferably in the form of short sections of glass tubing. Packing-strips 18 form seats for the tubes and prevent the escape of oil. Mounted on the upper end of the spindle is a disk 19, having a peripheral flange 20, that embraces the upper edge of the tube 10, a packing-ring 21 being also introduced at this point, and projecting from the disk is a nipple 22, to which the lower end of the supply-tube 12 is coupled. This disk is further provided with a threaded opening for the reception of a screw 23, which may be loosened or withdrawn to allow the escape of air during the entrance of oil to the upper or reservoir chamber of the lubricator. The disk is held in place by a nut 24, adapted to the threaded upper end of the spindle 15, a suitable packing-ring 26 and washer 27 being placed between the nut and the top of the disk to prevent leakage of the oil around the spindle. On top of the threaded portion of the spindle is mounted a cap-nut 29, which may be removed when necessary.

At the lower portion of the cup is arranged a disk 30, having an annular flange 31 for the purpose of retaining the lower end of the tubular wall of the feed-chamber 11. A packing-ring 32 is also placed at this point to prevent leakage.

The lower disk is held in place by a coupling-sleeve 34, that is screwed onto the lower threaded end of the hollow spindle, a packing-ring 35 and washer 36 being introduced between the collar and the disk. The lower end of the collar is reduced in diameter and provided with peripheral threads in order that it may be screwed into a threaded opening formed in the cylinder.

The lower end of the spindle 15 is faced to form a tapered valve-seat 36′, arranged for the reception of a valve 37, that is supported by a rod 38, extending through the bore of the spindle, and at the upper end of the rod is a threaded nut 39, between which and a seat at the head of the spindle is arranged a helical compression-spring 40, which exerts its force to keep the valve closed. The valve opens under a partial vacuum created within the casing during the outstroke, and the resistance to the opening movement may be adjusted by turning the nut 39.

In the lower portion of the wall of the spindle is an inclined port 43 for placing the lower portion of the feed-chamber 11 in communication with the interior of the spindle, and each time the valve 37 is opened on the outstroke any oil contained within the chamber 11 will be sucked into the casing. On the suction and explosion strokes the valve will be closed.

Extending through the partition 16 is a port 45, through which oil may flow from the reservoir 10 to the feed-chamber 11, the oil dropping from a small teat 46 on the lower side of the partition. In this port is arranged a ported valve 47, which may be turned to control the effective area of the port, and thus regulate the quantity of oil passing during a given period of time from the reservoir to the feed-chamber. The outer end of the valve-stem projects beyond the partition and is provided with a rocker-arm 48, that is held in place by a set-screw 49. The outer end of this arm is provided with an extensible portion 50, having a slot 51 for the passage of a screw 52 for locking the extensible portion of the arm in adjusted position, so that the arm may be made of any desired length in order to accommodate the adjustments of other portions of the mechanism to which said arm is connected, and said arm may be adjusted independently or may be connected to other portions of the engine, in accordance with the type of engine on which it is employed. The partition 16 is further provided with a port 54 under the control of a hollow valve 55, that projects beyond the periphery of the flange and is provided with a suitable handle 56. This valve will remain in open position during the operation of the engine in order to admit atmospheric air to the feed-chamber, and thus break the vacuum within the chamber during the outstroke of the piston. It will also operate to permit the escape of any compressed air or gas that may enter the feed-chamber in the event of the slow closing of the valve 37, the principal object being to maintain the space within the chamber 11 at atmospheric pressure.

In the operation of the device as thus far described oil will flow drop by drop or in a very small stream through the valved port 45 to the feed-chamber 15, accumulating in said feed-chamber between the outstrokes of the piston, and the valve is so adjusted as to accurately determine the quantity of oil passing, so that the proper amount may be supplied in accordance with the speed and size of the engine. At each outstroke the valve 37 is opened and the whole quantity of oil within the feed-chamber is drawn into the casing. On the explosion and suction strokes the valve is closed, and another quantity of oil accumulates within the feed-chamber in readiness for the next outstroke. The speed of the engine is the principal factor for determining the quantity of lubricant required, and in practically all engines of this type provision is made for advancing the spark in order to increase the speed, a spark-timing mechanism of any type being employed for the purpose. In the present instance the spark-timing device includes an adjustable contact-carrier a, having an arm b, that is connected to a lever c, pivoted on the seat-post of the bicycle-frame, and this lever is connected to any suitable operating-handle within convenient reach of the operator. By moving this handle the spark may be timed to effect increase or decrease in the speed of the engine. This lever c is connected to the valved arm 48 by means of a rod 57, the connection being so arranged that as the spark is advanced the effective area of the port 45 will be increased, so that the quantity of oil flowing through the port will be greater, while the engine is running at high speed than while running at low speed. In this manner the quantity of oil supplied is determined by the speed of the engine. The arrangement may be such as to feed precisely the same quantities of oil for each stroke of the engine, no matter what the speed may be, or smaller quantities may be fed at slow speed and larger quantities at high speed, in accordance with the relative adjustment of the parts. In engines of this type it is usual to employ kerosene for the purpose of cutting the oil within the cylinder and removing accumulations. For this purpose a feed-opening 60 is formed in the coupling 34, this opening being normally covered by a cap-piece 61, which may be removed in order to permit the insertion of the oil. After the engine has been cleaned by the kerosene-oil it is necessary to employ a rather large quantity of lubricating-oil in order to permit the proper working of the parts, and for this purpose the partition is provided with an additional port 63, having a suitable valve 64, which may be turned in order to allow oil to flow freely from the reservoir 10 to the lower chamber and then be sucked into the casing as the engine is turned over by hand, the parts being lubricated effectively before starting. This valve 64 is normally closed while the engine is operating.

It will be seen from the foregoing description that the improvements herein described, while simple in character, will be thoroughly efficient for the purposes designed and will result in an effective feeding of a predetermined quantity of lubricant to the part to be lubricated and will at the same time prevent waste.

While the lubricator of this invention is particularly adapted for use upon motor-bicycles, it is to be understood that it may be used upon any other form of motor or engine where its use will be found of advantage.

Having thus described the invention, what is claimed is—

1. The combination with an internal-combustion engine, of a lubricator connected thereto, means for regulating the speed of the engine, and mechanism connected to the speed-regulating means for governing the quantity of lubricant fed from the lubricator at each stroke of the engine.

2. The combination with an internal-combustion engine, of a speed-regulating means for the engine, and a lubricator connected to the speed-regulating means and adjustable therewith to increase the quantity of lubricant fed at each stroke of the piston as the speed of the engine increases, and to reduce the quantity of lubricant fed at each stroke as the speed of the engine decreases.

3. The combination with an internal-combustion engine, of means for regulating the speed of the engine, a lubricant-reservoir, a feed-chamber in communication therewith, a valve connected to the speed-regulating means and adjustable in accordance with the speed of the engine to govern the rate of flow of the lubricant from the reservoir to the chamber, and means for establishing communication between the chamber and the casing of the engine during the outstroke of the piston.

4. The combination with an internal-combustion engine, of a lubricator connected thereto, means for regulating the speed of the engine, and mechanism connected to the speed-regulating means for governing the quantity of lubricant fed from the lubricator.

5. The combination with an internal-combustion engine having a spark-timer, of a lubricating device, and means connected to and adjustable with the spark-timer for regulating the quantity of lubricant passing to the engine.

6. In a lubricator, a pair of superposed chambers, the upper forming a reservoir, and the lower a feed-chamber, a pair of valved ports through which said chambers may be placed in communication with each other, an adjusting mechanism connected to one of the valves, the second valve being manually adjustable to open or closed position, and a suction-opened discharge-valve for permitting the flow of lubricant from the feed-chamber.

7. In a lubricator, a hollow spindle having an annular flange arranged intermediate its ends, upper and lower cap members mounted on the spindle, tubular casings extending between the flange and the cap members and forming superposed chambers, one constituting an oil-reservoir and the other a feed-chamber, there being a valved port extending through the flange, and a port extending from the lower chamber to the interior of the hollow spindle, the lower end of said spindle being arranged to form a valve-seat, a valve adapted to said seat, a rod extending through the spindle, a spring acting on said rod, and tending to close the valve, and means for connecting the upper chamber to a main lubricant-reservoir.

8. In a lubricator, a hollow spindle having an annular flange about midway of its ends, cap members fitted on the end portions of the spindle, tubular casings held between the flange and cap members, packing-rings arranged at the end of the casings to form fluid-proof joints, the upper of the casings constituting an oil-reservoir, and the lower a feed-chamber, there being a port extending through the wall of the lower portion of the chamber for the outflow of oil from the lower chamber, and a pair of ports extending through the flange, a valve arranged in one of said ports, an adjusting device connected to said valve, a second manually-operable valve arranged in the second port, there being an air-port leading from the outer edge of the flange to the lower chamber, a valve in said port, a coupling-collar screwed to the lower end of the spindle, the lower end of said spindle being shaped to form a valve-seat, a suction-opened valve adapted to said seat, a valve-rod extending through the spindle, a spring arranged at the upper end of the spindle and tending to hold the valve closed, a lock-nut at the upper threaded end of the spindle, a cap covering the end of the spindle, and concealing the spring, a removable plug screwed in the upper cap, and a coupling-nipple extending from the upper cap for connection to a main supply-reservoir.

In testimony that I claim the foregoing as my own I have hereto affixed my signature in the presence of two witnesses.

LESTER DARIUS PICKETT.

Witnesses:
C. E. DOYLE,
FRANK S. APPLEMAN